US012627099B2

(12) United States Patent
Barrett

(10) Patent No.: US 12,627,099 B2
(45) Date of Patent: May 12, 2026

(54) PLUG FOR A CONNECTOR

(71) Applicant: SIEMENS ENERGY LIMITED, Newcastle Upon Tyne (GB)

(72) Inventor: Wesley Barrett, Kendal (GB)

(73) Assignee: SIEMENS ENERGY LIMITED, Newcastle Upon Tyne (GB)

( * ) Notice: Subject to any disclaimer, the term of this patent is extended or adjusted under 35 U.S.C. 154(b) by 363 days.

(21) Appl. No.: 18/430,901

(22) Filed: Feb. 2, 2024

(65) Prior Publication Data

US 2024/0297461 A1 Sep. 5, 2024

(30) Foreign Application Priority Data

Mar. 1, 2023 (GB) ..................................... 2303003

(51) Int. Cl.

| | |
|---|---|
| ***H01R 43/26*** | (2006.01) |
| ***H01R 13/523*** | (2006.01) |
| ***H01R 13/631*** | (2006.01) |

(52) U.S. Cl.
CPC ......... *H01R 13/631* (2013.01); *H01R 13/523* (2013.01); *H01R 43/26* (2013.01); *H01R 2201/26* (2013.01)

(58) Field of Classification Search
None
See application file for complete search history.

(56) References Cited

U.S. PATENT DOCUMENTS

| | | | | |
|---|---|---|---|---|
| 8,267,707 | B2 * | 9/2012 | Rogers | H01R 13/52 439/271 |
| 8,480,437 | B2 * | 7/2013 | Dilmaghanian | A61N 1/3752 439/669 |
| 10,224,684 | B2 * | 3/2019 | Pratt | H01R 35/04 |
| 2005/0116799 | A1 | 6/2005 | Ostergaard | |
| 2008/0284160 | A1 | 11/2008 | Voster | |

(Continued)

FOREIGN PATENT DOCUMENTS

| | | |
|---|---|---|
| CN | 111463624 B | 3/2021 |
| EP | 2853680 A1 | 4/2015 |

OTHER PUBLICATIONS

Combined Search and Examination Report mailed Aug. 25, 2023 corresponding to Application No. GB 2303003.4 filed Mar. 1, 2023.

*Primary Examiner* — Tho D Ta

(57) ABSTRACT

A plug includes a housing defining an inner space that is sealably separated from the underwater environment, a first contact disposed within the inner space and including a first conducting region, a second contact disposed within the inner space and including a second conducting region, a third contact disposed within the inner space and including a third conducting region, and a connection cartridge selectively movable between three discrete positions without disconnecting the plug from the receptacle. A first position provides an electrical connection between the first conducting region and the second conducting region and insulates the third conducting region, a second position in which the first conducting region, the second conducting region, and the third conducting region are electrically connected to one another, and a third position in which the first conducting region, the second conducting region, and the third conducting region are electrically insulated from one another.

18 Claims, 6 Drawing Sheets

(56) References Cited

U.S. PATENT DOCUMENTS

| | | | | |
|---|---|---|---|---|
| 2011/0021049 | A1* | 1/2011 | Ramasubramanian | H01R 13/521 439/271 |
| 2016/0233608 | A1 | 8/2016 | Burrow et al. | |
| 2017/0309432 | A1 | 10/2017 | Lell | |

* cited by examiner

PLUG FOR A CONNECTOR

BACKGROUND

Connections, such as electrical connections, are required to be made under water. For example, a subsea installation for the production of hydrocarbons from a subsea well in which different components of the subsea installation require connecting for power and/or data communication. Such connections may comprise a connection from a topside installation, such as a floating or fixed platform or from an onshore site to a subsea component via an umbilical or subsea cable. Other connections include electrical connections between different types of subsea equipment, such as a connection between a subsea transformer and subsea switchgear for the transfer of electrical power.

A connector assembly comprises a receptacle and a plug. The receptacle has an array of exposed connector pin conductors, and the plug has a corresponding array of socket contacts which are encapsulated in a dielectric oil chamber, where the electrical connection can be safely made during mating of the plug and receptacle. When the receptacle is underwater and not connected to a corresponding plug it is desirable to prevent or inhibit corrosion and electrically insulate exposed connector pins. The electrical connector pins are expensive to manufacture and cannot be replaced in situ. Overhaul of a defective connector and it's respective cable harness results in costly downtime of subsea equipment. Corrosion and subsequent failure in service can cause attenuation or interruption in the transmission of electrical power and signals, which is highly undesirable.

Enhanced subsea corrosion protection and electrical insulation to inhibit corrosion and electrically insulate exposed connector pins that are deployed subsea would solve or reduce many of these problems.

BRIEF SUMMARY

In one aspect, a plug is arranged to make an underwater electrical connection with a receptacle. The plug includes a housing defining an inner space that is sealably separated from the underwater environment, a first contact disposed within the inner space and including a first conducting region, a second contact disposed within the inner space and including a second conducting region, a third contact disposed within the inner space and including a third conducting region, and a connection cartridge selectively movable between three discrete positions without disconnecting the plug from the receptacle. A first position provides an electrical connection between the first conducting region and the second conducting region and insulates the third conducting region, a second position in which the first conducting region, the second conducting region, and the third conducting region are electrically connected to one another, and a third position in which the first conducting region, the second conducting region, and the third conducting region are electrically insulated from one another.

The receptacle receives or provides three-phase power to the plug, and the first contact is electrically connected to a first phase of the three-phase power, the second contact is electrically connected to a second phase of the three-phase power, and the third contact is electrically connected to a third phase of the three-phase power.

The plug may also include a handle coupled to the connection cartridge and movable along an axis by a remotely operated vehicle (ROV) to any of the three discrete positions.

The plug may also include a handle coupled to a rotary to linear convertor disposed within the housing, the handle rotatable about an axis by a remotely operated vehicle (ROV) to position the connection cartridge in any of the three discrete positions.

The plug may also include a connection cartridge that is further movable to a fourth position in which the first conducting region, the second conducting region, and the third conducting region are electrically connected to one another through a star-linked resistor arrangement.

The plug may also include a connection cartridge that includes a first disk, a second disk, and a third disk, each of the first disk, the second disk, and the third disk, including a first aperture aligned and sized to receive the first contact, a second aperture aligned and sized to receive the second contact, and a third aperture aligned and sized to receive the third contact.

The plug may also include a connection cartridge that is further movable to a fifth position in which the first conducting region and the third conducting region are electrically connected to one another and the second conducting region is electrically insulated, and where the connection cartridge is further movable to a sixth position in which the second conducting region and the third conducting region are electrically connected to one another and the first conducting region is electrically insulated.

The plug may also include a first disk, a second disk, and a third disk that are formed from an electrically insulating material, and where the first disk includes a first conductor portion positioned to provide an electrical connection between the first aperture and the second aperture.

The plug may also include a second disk having a second conductor portion positioned to provide an electrical connection between the first aperture, the second aperture, and the third aperture. Other technical features may be readily apparent to one skilled in the art from the following figures, descriptions, and claims.

In one aspect, a method of changing an underwater electrical connection made between a plug and a receptacle includes connecting the plug to the receptacle along an axis, and positioning a connection cartridge disposed within the plug in a first position to define a first connection arrangement between a first contact, a second contact, and a third contact disposed within the plug. The method further includes moving a handle without disconnecting the plug from the receptacle to move the connection cartridge to a second position, the second position defining a second connection arrangement between the first contact, the second contact, and the third contact that is different from the first connection arrangement.

The method may also include receiving or providing three-phase power from the receptacle to the plug, and electrically connecting the first contact to a first phase (A-phase) of the three-phase power, the second contact to a second phase (B-phase) of the three-phase power, and the third contact to a third phase (C-phase) of the three-phase power.

The method may also include moving a handle that is coupled to the connection cartridge along an axis to any of the three discrete positions using a remotely operated vehicle (ROV).

The method may also include rotatably moving a handle coupled to a rotary to linear convertor disposed within the housing, the rotary to linear convertor moving the connection cartridge along an axis to any of the three discrete positions.

The method may also include moving the connection cartridge to a fourth position in which the first conducting region, the second conducting region, and the third conducting region are electrically connected to one another through a star-linked resistor arrangement.

The method may also include a connection cartridge that includes a first disk, a second disk, and a third disk, the method further includes passing the first contact through a portion of a first aperture, the second contact through a portion of a second aperture and the third contact through a portion of a third aperture, the first aperture, the second aperture, and the third aperture formed in each of the first disk, the second disk, and the third disk. Other technical features may be readily apparent to one skilled in the art from the following figures, descriptions, and claims.

The method may also include moving the connection cartridge to one of a fifth position in which the first conducting region and the third conducting region are electrically connected to one another and the second conducting region is electrically insulated, and a sixth position in which the second conducting region and the third conducting region are electrically connected to one another and the first conducting region is electrically insulated.

The method may also include forming the first disk, the second disk, and the third disk from an electrically insulating material, and attaching a first conductor portion to the first disk, the first conductor portion positioned to provide an electrical connection between the first aperture and the second aperture.

The method may also include attaching a second conductor portion to the second disk, the second conductor portion positioned to provide an electrical connection between the first aperture, the second aperture, and the third aperture. Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
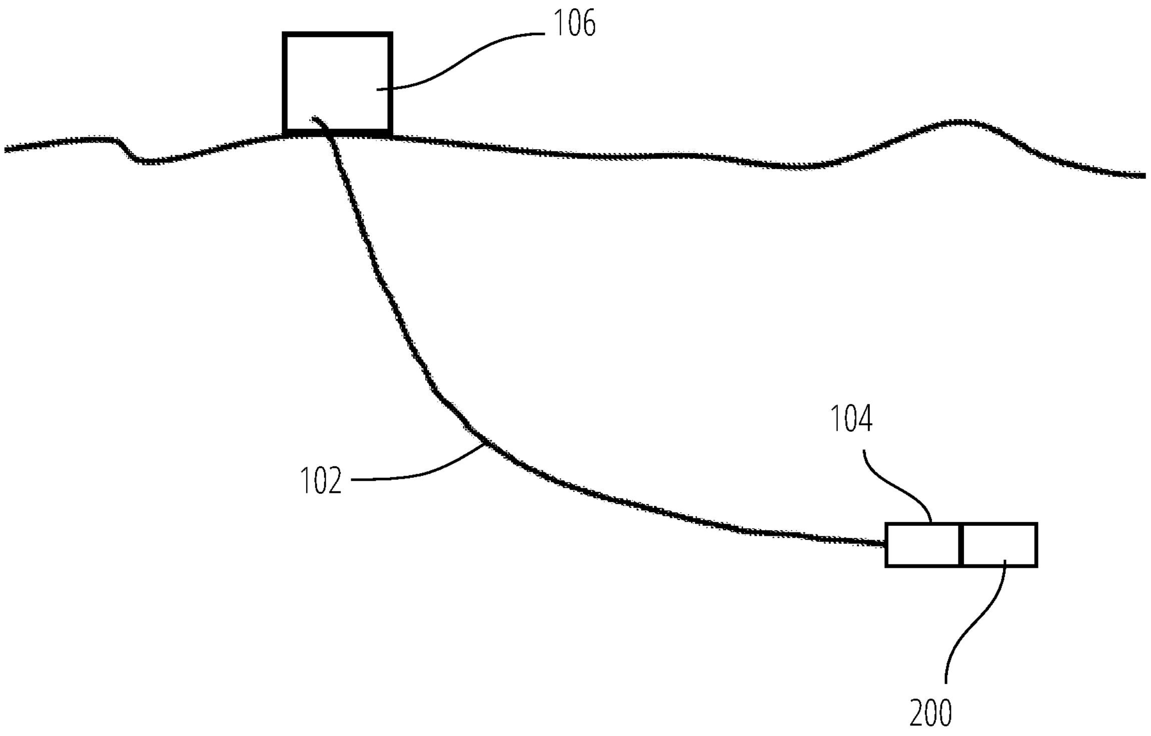
FIG. 1 is a perspective view of a subsea tree, or Christmas tree suitable for use in under-water drilling operations.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting. Furthermore, while multiple embodiments or constructions may be described herein, any features, methods, steps, components, and the like described with regard to one embodiment are equally applicable to other embodiments absent a specific statement to the contrary.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

While terms such as "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

FIG. 1 schematically illustrates a subsea arrangement in which an umbilical 102 extends from a platform 106 (e.g., ship, drilling platform, shore station, etc.) and ends at a receptacle 104. A plug 200 engages the receptacle 104 to enable tests to be performed from shore or the platform 106 by applying power to the umbilical 102 with the plug 200 engaged with the receptacle 104 which could be attached the umbilical 102 within a UTA (umbilical termination assembly) or some other equipment further down from the UTA such as a variable speed drive, switchgear, pipeline heating system, subsea pump etc. The different configurations of the plug 200 (discussed in detail below) allow an operator to run diagnostic tests to either check the health of the electrical system or fault find. Some plugs 200 merely act as protection for the receptacle pins but the plug 200 illustrated herein is well-suited for testing.

Figure 2:
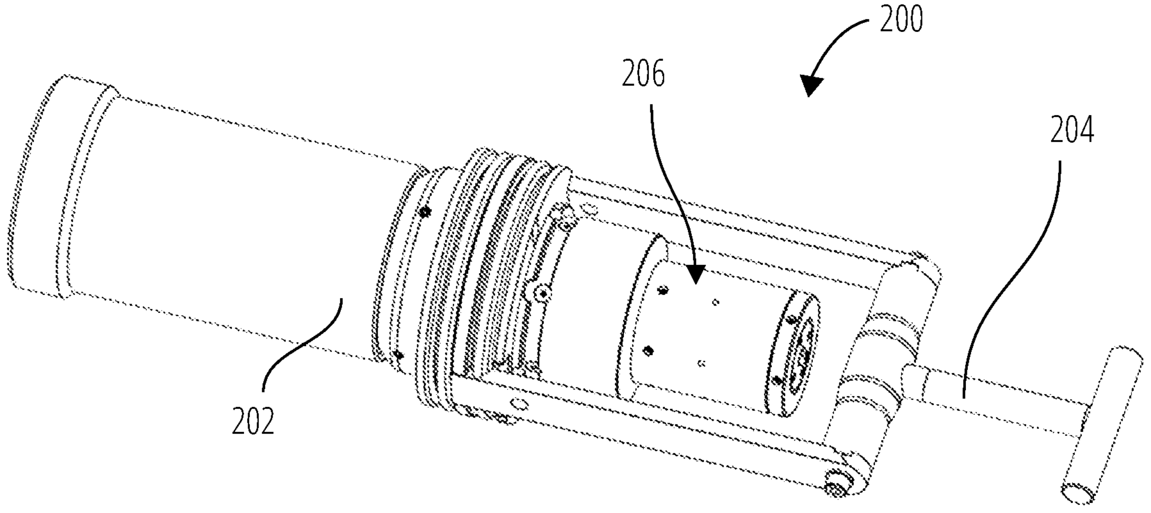
FIG. 2 is a perspective view of a portion of a plug adapted for engagement with a receptacle of the subsea tree of FIG. 1 to complete a connection.

As illustrated in FIG. 2, the plug 200 includes a plug housing 202, a grip member 204, and a gland 206. The plug housing 202 is arranged to engage a mating receptacle 104 to complete a connection between the plug 200 and the receptacle 104. The gland 206 is partially illustrated in FIG. 2 and defines one end of the plug 200. The grip member 204 is connected to the plug housing 202 and provides a convenient gripping location for attaching or removing the plug 200 from the umbilical 102. In the illustrated construction, the grip member 204 is arranged for gripping by a remotely operated vehicle (ROV) with other arrangements being possible.

Figure 3:
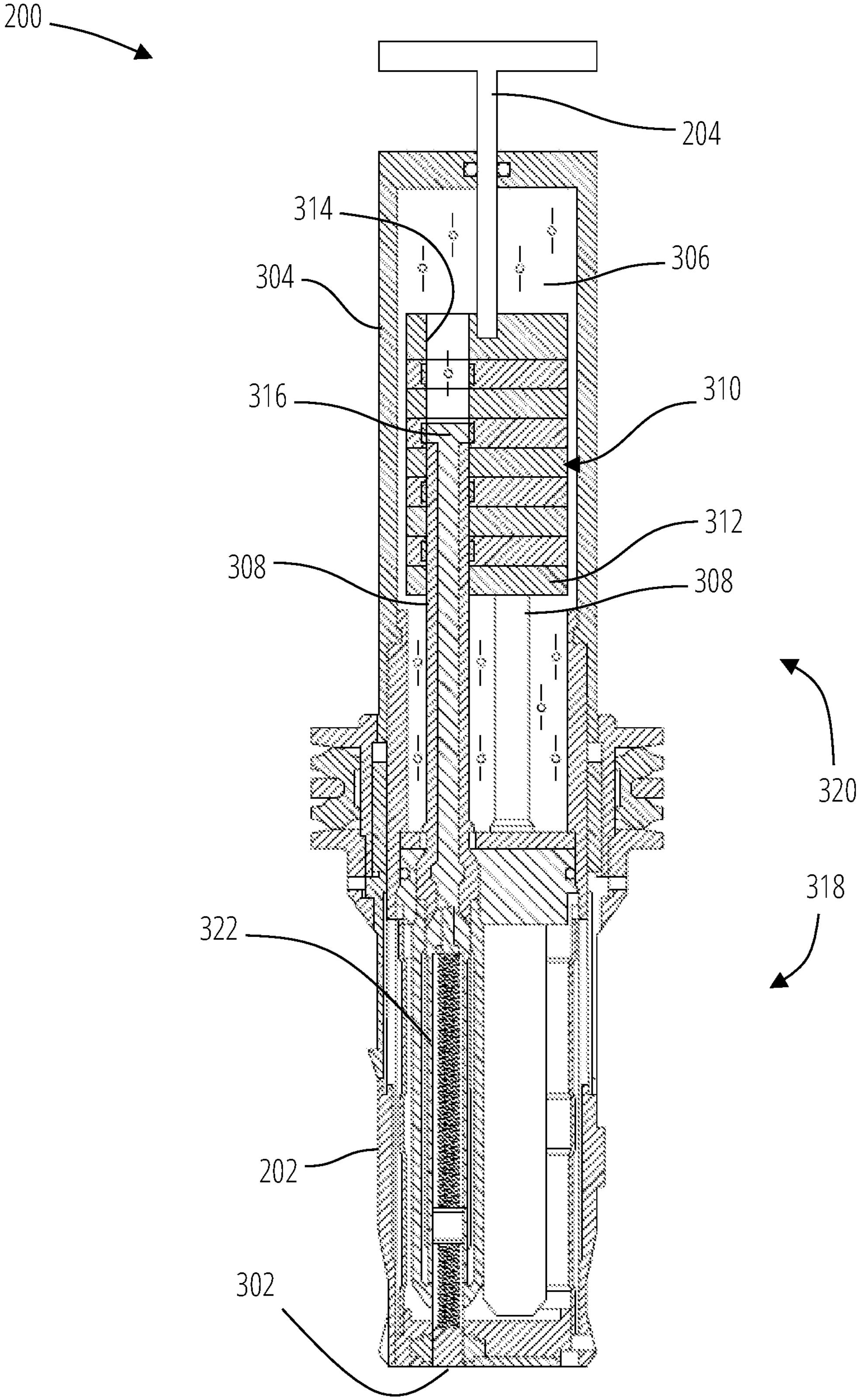
FIG. 3 is a section view of the plug of FIG. 2 including a movable connection cartridge in a first position.

FIG. 3 is a partial section view of the plug 200 of FIG. 2 taken through a center line that better illustrates the internal components of the plug 200. The plug 200 includes a plug end 318 and a dummy end 320 that attach to one another to complete the plug 200. The plug end 318 includes the plug housing 202 and one or more receptacle receivers 322 that are arranged to receive a corresponding receptacle pin (not shown). Each receptacle pin engages a pin interface 302 to initiate the electrical connection between the receptacle and the plug 200 as is well known in the art. In the illustrated construction, the plug end includes three receptacle receivers 322 with each receptacle receiver 322 including a corresponding pin interface 302. Other constructions or plugs may include fewer or more receptacle receivers 322 and pin interfaces 302 as may be required by the particular application or arrangement.

The dummy end 320 includes a compensated housing 304, a connection cartridge 310, and one or more contacts 308, with the illustrated construction including three contacts 308. The dummy end 320 connects to the plug housing 202 and defines an enclosed interior space that contains an insulating fluid 306 that is preferably a liquid such as oil.

The contacts 308 extend into the interior space from an end of the compensated housing 304 nearest the plug end 318. Each of the contacts 308 includes a conducting region 316 that is formed at or near the end positioned most distant from the plug end 318. In the illustrated construction, the conducting region 316 includes a slightly larger diameter than the remainder of the contact 308.

The connection cartridge 310 includes a plurality of disks 312 stacked in a direction that is substantially parallel to a long axis of the contacts 308. The connection cartridge 310 defines one or more apertures 314 with each aperture 314 sized to receive one of the contacts 308. In the illustrated construction, the connection cartridge 310 includes three apertures 314 arranged to allow the connection cartridge 310 to move linearly along the long axis of the contacts 308. The conducting region 316 of each contact 308 is sized to closely contact the interior of its respective aperture to allow for electrical conduction between the conducting region 316 and the disk 312 if such conduction is desired.

The grip member 204 extends through the compensated housing 304 and connects to the connection cartridge 310. Linear movement of the grip member 204 along the long axis of the contact 308 produces a similar linear movement of the connection cartridge 310. As noted, the grip member 204 is arranged for grasping by a person, a ROV, or any other device or arrangement to produce the desired movement.

Figure 4:
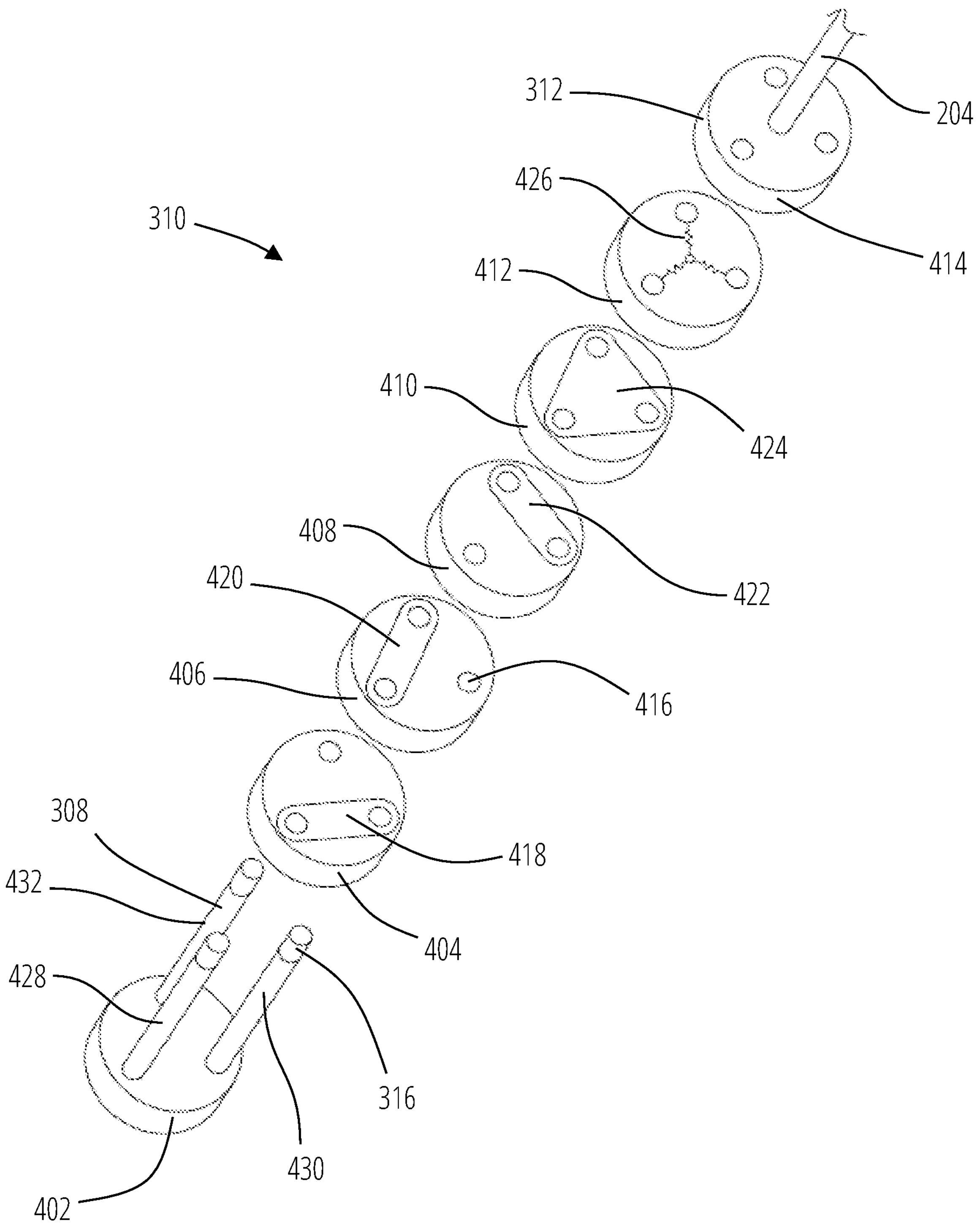
FIG. 4 is an exploded perspective view of the connection cartridge of FIG. 3.

FIG. 4 is an exploded view of the connection cartridge 310 illustrating one possible arrangement of disks 312. The connection cartridge 310 includes a plurality of disks 312 stacked along an axis parallel to the long axis of the contacts 308. Each disk 312 includes three disk holes 416 that pass through each respective disk 312 with each disk hole 416 cooperating with some of the disk holes 416 of the other disks 312 to define one of the apertures 314 and allow for the passage or receipt of one of the contacts 308 and its corresponding conducting region 316. A portion of the disks also include a conductor portion as will be discussed in greater detail. As noted previously, each of the disks 312 includes a number of disk holes 416 that corresponds to the number of contacts 308. Thus, in arrangements that include fewer than three contacts 308 the disks 312 could include fewer than three disk holes 416 and in arrangements with more than three contacts 308 the disks 312 would include more than three disk holes 416.

The connection cartridge 310 is arranged to engage the three contacts 308 which each extend from a bulkhead 402 that defines a portion of the plug housing 202, the compensated housing 304 or both.

In the illustrated construction, six disks 312 are stacked to define the connection cartridge 310. Most and preferably all the disks 312 are formed from an electrically non-conducting material. The disks 312 can be bonded to one another using any common technique including but not limited to welding, brazing, fasteners, or adhesives. Each disk 312 has a different arrangement to facilitate a different electrical connection between the contacts 308. In the arrangement of FIG. 4, the contacts 308 include an A-phase contact 428, a B-phase contact 430, and a C-phase contact 432 as might be used in a three-phase power system.

The connection cartridge 310 of FIG. 4 includes an A-B disk 404, an A-C disk 406, a B-C disk 408, an ABC disk 410, a resistor disk 412, and an insulated disk 414 with more or fewer disks with different arrangements being possible. The A-B disk 404 includes a conductor portion in the form of an A-B conductor 418 that is coupled to the A-B disk 404 and provides an electrical connection between the disk hole 416 that is positioned to receive the A—phase contact 428 and the disk hole 416 that is positioned to receive the B-phase contact 430. The A-B conductor 418 is sized to make an electrical connection between the A-phase contact 428 and the B-phase contact 430 when the conducting regions 316 of the A-phase contact 428 and the B-phase contact 430 are disposed within the respective disk holes 416 of the A-B disk 404. The A-B conductor 418 may be attached to the A-B disk 404 using any common means including brazing, welding, fasteners, adhesives and the like. In some arrangements, the A-B conductor 418 is formed into or as part of the A-B disk 404 such that it cannot be removed without destroying or damaging the A-B disk 404.

The A-C disk 406 and the B-C disk 408 are similar to the A-B disk 404 with the exception of the positioning of the A-C conductor 420 and the B-C conductor 422 with respect to the A-phase contact 428, the B-phase contact 430, and the C-phase contact 432. In the illustrated arrangement, the A-C disk 406 and the B-C disk 408 can be identical to the A-B disk 404. When assembled into the connection cartridge 310, the A-C disk 406 is rotated 120 degrees with respect to the A-B disk 404 and the B-C disk 408 is rotated another 120 degrees with respect to the A-C disk 406. Other constructions could employ different positions for the contacts 308 which would in turn require different positions or arrangements for the A-B disk 404, the A-C disk 406, and the B-C disk 408.

The ABC disk 410 includes a conductor portion in the form of an ABC conductor 424 that electrically connects each of the three disk holes 416 formed in the ABC disk 410. The ABC conductor 424 can be connected to the ABC disk 410 in the same manner as described with regard to the A-B disk 404 or in another manner as may be desired. The ABC conductor 424 is arranged to make contact with the conducting region 316 of each of the A-phase contact 428, the B-phase contact 430, and the C-phase contact 432 when the conducting regions 316 are positioned within the ABC disk 410. Thus, the ABC disk 410 connects each of the phases of the three-phase power system in a Delta configuration. The material or arrangement of the ABC conductor 424 can be selected to provide a desired level of resistance between the phases of the three-phase power system.

The resistor disk 412 includes a conductor portion in the form of a star-linked resistor arrangement 426 that connects the three disk holes 416 in a star or wye configuration. The star-linked resistor arrangement 426 can be attached to the resistor disk 412 in any desired manner including, for example an adhesive or epoxy. In one construction, the star-linked resistor arrangement 426 is embedded in the resistor disk 412. When the conducting regions 316 of the A-phase contact 428, the B-phase contact 430, and the C-phase contact 432 are positioned within the disk holes 416 of the resistor disk 412, the three phases are connected to define a star or wye circuit.

The insulated disk 414 includes three disk holes 416 that are electrically insulated from one another by the material of the insulated disk 414. When the conducting regions 316 of the A-phase contact 428, the B-phase contact 430, and the C-phase contact 432 are positioned within the disk holes 416 of the insulated disk 414, the three phases are insulated or isolated from one another.

Some constructions may omit the insulated disk 414 and simply allow the conducting regions 316 of the various contacts 308 are outside of any disks 312 and therefore electrically separated from one another or even insulated from one another by the insulating fluid 306 within the compensated housing 304.

It should be noted that the order of the disks 312 within the connection cartridge 310 is not relevant to the operation of the device as any order could be employed. In addition, fewer or more disks that provide different connections or additional circuit elements could be employed if desired.

The operation of the plug 200 will be described with reference to FIG. 3 which shows the connection cartridge 310 in a first position and FIG. 5 which shows the connection cartridge 310 in a second position. In FIG. 3, the plug 200 is in the first position where the conducting regions 316 of each of the contacts 308 is positioned within the B-C disk 408 such that the B-phase contact 430 and the C-phase contact 432 are electrically connected to one another and the A-phase contact 428 is insulated from the B-phase contact 430 and the C-phase contact 432.

Figure 5:
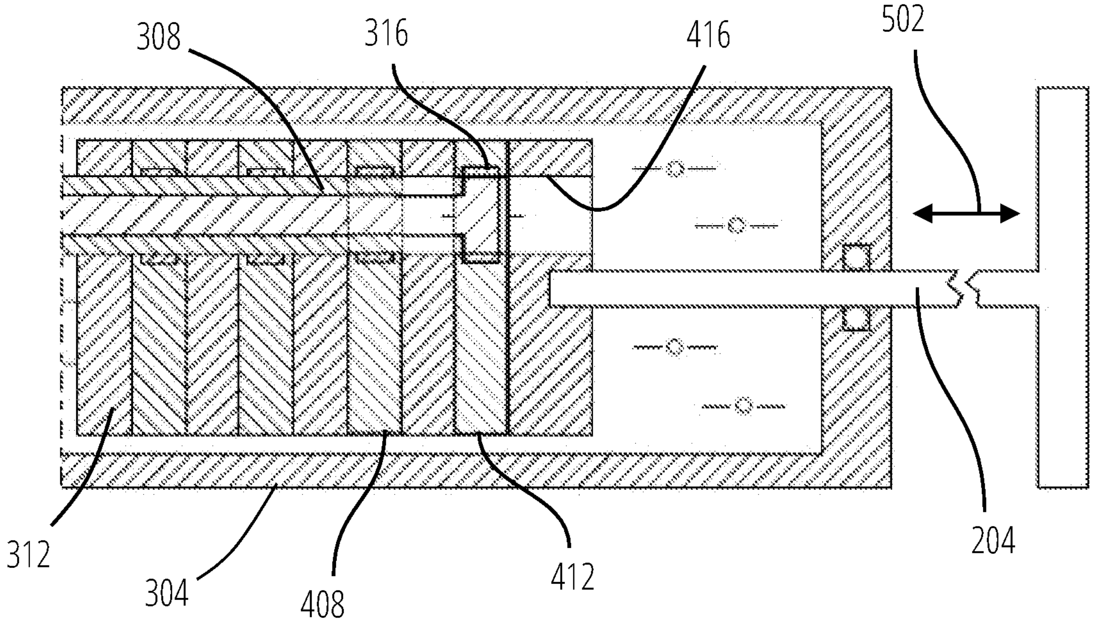
FIG. 5 is a partial section view of the plug of FIG. 3 with the connection cartridge in a second position.

To transition the plug 200 to the second position illustrated in FIG. 5 a user or a tool such as a ROV grabs or grips the grip member 204 and moves the grip member 204 linearly along the adjustment axis 502 to adjust the position of the connection cartridge 310 with respect to the conducting regions 316. To transition from the first position to the second position the grip member 204 is pushed toward the plug 200 to move the connection cartridge 310 toward the plug end 318. The movement of the connection cartridge 310 moves the conducting region 316 of each of the contacts 308 from a position within the disk holes 416 of the B-C disk 408 to a position within the disk holes 416 of the resistor disk 412, thereby transitioning the three-phase power system from a condition in which the B-phase contact 430 and the C-phase contact 432 are connected and the A-phase contact 428 is insulated to a condition in which each of the A-phase contact 428, the B-phase contact 430, and the C-phase contact 432 are connected in a star or wye arrangement. Similar linear movement allows a user or tool to selectively move the connection cartridge 310 to connect or isolate the A-phase contact 428, the B-phase contact 430, and the C-phase contact 432 using any of the disks 312 provided.

Figure 6:
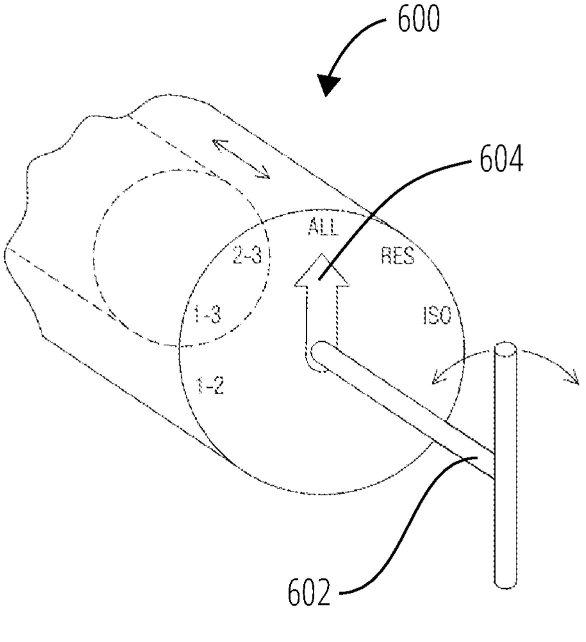
FIG. 6 is a perspective view of a portion of another plug including a rotary handle that is rotatable to move the connection cartridge.

FIG. 6 illustrates another arrangement of a plug 600 where adjustment of the connection cartridge 310 is made through rotation of a rotary handle 602 rather than through translation of the grip member 204. The rotary handle 602 is still rotated by a user, a tool, or an ROV. In addition, an indicator 604 can be provided to help guide a user as the rotary handle 602 is rotated. A similar indicator 604 could be provided in the construction of FIG. 5 if desired.

The plug 600 includes a mechanism for converting the rotary motion of the rotary handle 602 into linear translation of the connection cartridge 310 as was described previously. Suitable mechanisms could include rack and pinion systems, gear arrangements, screw arrangements (lead screws, ball screws, etc.), linkages such as crank and slider mechanisms, Scotch yokes, magnets, and the like.

While the rotary handle 602 is illustrated extending from the end of the compensated housing 304, other arrangements could position the rotary handle 602 at a ninety-degree orientation to that shown such that it extends in a direction normal to the adjustment axis 502 of FIG. 5. As discussed, similar mechanisms could be employed to convert the rotary motion to linear motion of the connection cartridge 310.

The plugs 200, 600 illustrated herein are advantageous as a single plug can be used to make multiple different connections as may be required for any application. Rather than having different plugs for each desired circuit, the plug 200, 600 can be configured for the desired circuit and installed. If for some reason, the desired circuit changes, the plug can be transitioned to the new circuit arrangement without removing or disconnecting the plug 200, 600 from the receptacle.

Figure 7:
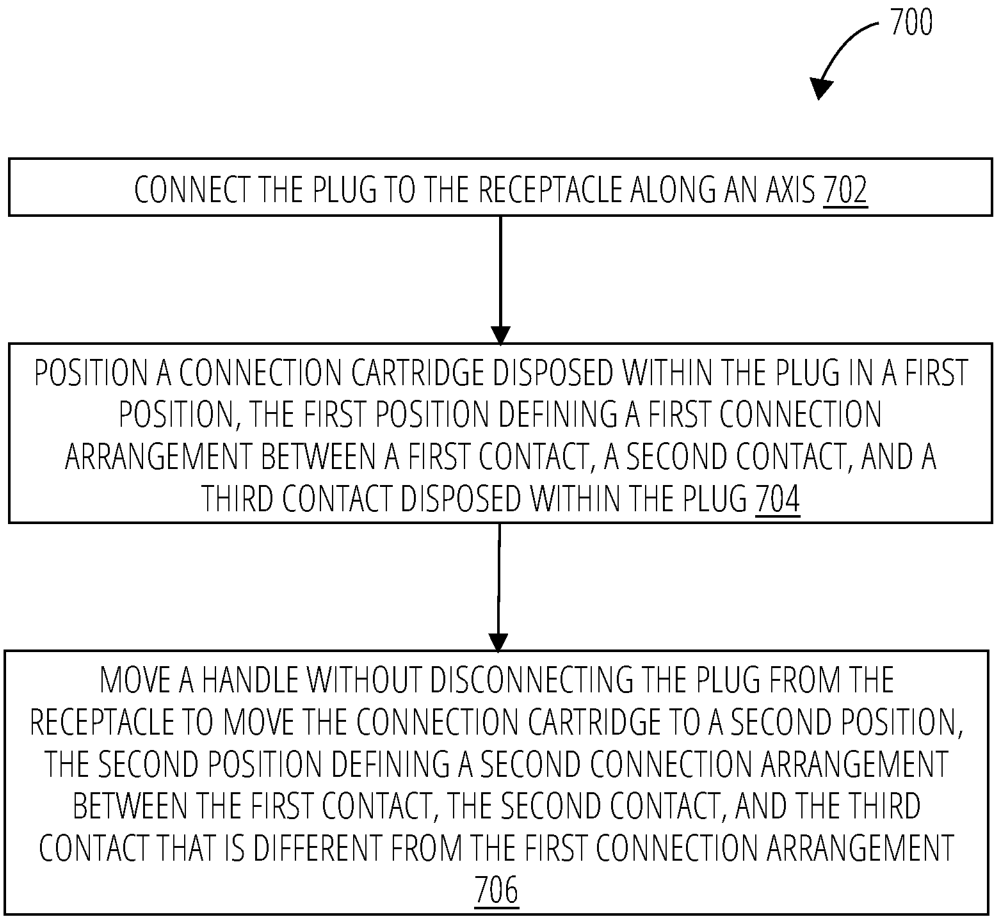
FIG. 7 is a flow chart illustrating a method of changing an electrical connection in the plug of FIG. 3 and FIG. 6.

FIG. 7 broadly illustrates a method of changing an electrical connection 700 and particularly a method of changing an electrical connection 700 in an underwater connection.

In block 702, the method of changing an electrical connection 700 connects the plug 200, 600 to the receptacle along an axis. In block 704, the method of changing an electrical connection 700 positions the connection cartridge 310 disposed within the plug 200, 600 in a first position, the first position defining a first connection arrangement between a first contact, a second contact, and a third contact disposed within the plug 200, 600. In block 706, the method of changing an electrical connection 700 moves a handle or grip member 204 without disconnecting the plug 200, 600 from the receptacle to move the connection cartridge 310 to a second position, the second position defining a second connection arrangement between the first contact, the second contact, and the third contact that is different from the first connection arrangement.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A plug arranged to make an underwater electrical connection with a receptacle, the plug comprising:

a housing defining an inner space that is sealably separated from the underwater environment;

a first contact disposed within the inner space and including a first conducting region;

a second contact disposed within the inner space and including a second conducting region;

a third contact disposed within the inner space and including a third conducting region; and a connection cartridge selectively movable between three discrete positions without disconnecting the plug from the receptacle, wherein a first position provides an electrical connection between the first conducting region and the second conducting region and insulates the third conducting region, a second position in which the first conducting region, the second conducting region, and the third conducting region are electrically connected to one another, and a third position in which the first conducting region, the second conducting region, and the third conducting region are electrically insulated from one another.

2. The plug of claim 1, wherein the receptacle receives or provides three-phase power to the plug, and wherein the first contact is electrically connected to a first phase of the three-phase power, the second contact is electrically connected to a second phase of the three-phase power, and the third contact is electrically connected to a third phase of the three-phase power.

3. The plug of claim 1, further comprising a handle coupled to the connection cartridge and movable along an axis by a remotely operated vehicle (ROV) to any of the three discrete positions.

4. The plug of claim 1, further comprising a handle coupled to a rotary to linear convertor disposed within the housing, the handle rotatable about an axis by a remotely operated vehicle (ROV) to position the connection cartridge in any of the three discrete positions.

5. The plug of claim 1, wherein the connection cartridge is further movable to a fourth position in which the first conducting region, the second conducting region, and the third conducting region are electrically connected to one another through a star-linked resistor arrangement.

6. The plug of claim 5, wherein the connection cartridge is further movable to a fifth position in which the first conducting region and the third conducting region are electrically connected to one another and the second conducting region is electrically insulated, and wherein the connection cartridge is further movable to a sixth position in which the second conducting region and the third conducting region are electrically connected to one another and the first conducting region is electrically insulated.

7. The plug of claim 1, wherein the connection cartridge includes a first disk, a second disk, and a third disk, each of the first disk, the second disk, and the third disk, including a first aperture aligned and sized to receive the first contact, a second aperture aligned and sized to receive the second contact, and a third aperture aligned and sized to receive the third contact.

8. The plug of claim 7, wherein the first disk, the second disk, and the third disk are formed from an electrically insulating material, and wherein the first disk includes a first conductor portion positioned to provide an electrical connection between the first aperture and the second aperture.

9. The plug of claim 7, wherein the second disk includes a second conductor portion positioned to provide an electrical connection between the first aperture, the second aperture, and the third aperture.

10. A method of changing an underwater electrical connection made between a plug and a receptacle, the method comprising:

connecting the plug to the receptacle along an axis;

positioning a connection cartridge disposed within the plug in a first position, the first position defining a first connection arrangement between a first contact, a second contact, and a third contact disposed within the plug; and moving a handle without disconnecting the plug from the receptacle to move the connection cartridge to one of a second position, the second position defining a second connection arrangement between the first contact, the second contact, and the third contact that is different from the first connection arrangement and a third position, the third position defining a third connection arrangement between the first contact, the second contact, and the third contact that is different from the first connection arrangement and the second connection arrangement.

11. The method of claim 10, further comprising receiving or providing three-phase power from the receptacle to the plug, and electrically connecting the first contact to a first phase of the three-phase power, the second contact to a second phase of the three-phase power, and the third contact to a third phase of the three-phase power.

12. The method of claim 10, wherein the handle is coupled to the connection cartridge and the moving step further comprises moving the handle along an axis to any of the three discrete positions using a remotely operated vehicle (ROV).

13. The method of claim 10, further comprising rotatably moving the handle, the handle coupled to a rotary to linear convertor disposed within the housing, the rotary to linear convertor moving the connection cartridge along an axis to any of the three discrete positions.

14. The method of claim 10, further comprising moving the connection cartridge to a fourth position in which the first contact, the second contact, and the third contact are electrically connected to one another through a star-linked resistor arrangement.

15. The method of claim 14, further comprising moving the connection cartridge to one of a fifth position in which the first contact and the third contact are electrically connected to one another and the second contact is electrically insulated, and a sixth position in which the second contact and the third contact are electrically connected to one another, and the first contact is electrically insulated.

16. The method of claim 10, wherein the connection cartridge includes a first disk, a second disk, and a third disk, the method further comprising passing the first contact through a portion of a first aperture, the second contact through a portion of a second aperture and the third contact through a portion of a third aperture, the first aperture, the second aperture, and the third aperture formed in each of the first disk, the second disk, and the third disk.

17. The method of claim 16, further comprising forming the first disk, the second disk, and the third disk from an electrically insulating material, and attaching a first conductor portion to the first disk, the first conductor portion positioned to provide an electrical connection between the first aperture and the second aperture.

18. The method of claim 16, further comprising attaching a second conductor portion to the second disk, the second conductor portion positioned to provide an electrical connection between the first aperture, the second aperture, and the third aperture.

* * * * *